US006928495B2

(12) United States Patent
LeBlanc et al.

(10) Patent No.: US 6,928,495 B2
(45) Date of Patent: *Aug. 9, 2005

(54) METHOD AND SYSTEM FOR AN ADAPTIVE MULTIMODE MEDIA QUEUE

(75) Inventors: Wilf LeBlanc, Vancouver (CA); Phil Houghton, Surrey (CA); Kenneth Cheung, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/828,112

(22) Filed: Apr. 20, 2004

(65) Prior Publication Data

US 2004/0215851 A1 Oct. 28, 2004

Related U.S. Application Data

(62) Division of application No. 10/313,826, filed on Dec. 6, 2002, now Pat. No. 6,848,012.
(60) Provisional application No. 60/414,492, filed on Sep. 27, 2002.

(51) Int. Cl.$^7$ .............................. G06F 3/05; G06F 3/00; H04B 1/66
(52) U.S. Cl. .............................. 710/52; 710/15; 710/16; 710/18; 710/19; 710/29; 710/30; 710/40; 710/56; 710/62; 710/72; 710/310; 370/412; 370/465; 370/468; 370/240; 370/240.02; 375/240.21
(58) Field of Search ................................ 710/39, 52–57, 710/310, 14–19, 29, 30, 60, 62–64, 72–74; 370/412, 465, 460; 375/240, 240.02, 240.21

(56) References Cited

U.S. PATENT DOCUMENTS

| 4,211,897 | A | * | 7/1980 | Ichikawa et al. ............ 708/311 |
| 5,301,191 | A | | 4/1994 | Otani ......................... 370/468 |
| 5,367,522 | A | | 11/1994 | Otani ......................... 370/468 |
| 5,436,890 | A | | 7/1995 | Read et al. .................. 370/352 |
| 5,504,759 | A | * | 4/1996 | Inoue et al. ................. 714/755 |
| 5,526,359 | A | | 6/1996 | Read et al. .................. 370/516 |
| 5,664,226 | A | | 9/1997 | Czako et al. ................. 710/52 |
| 5,751,712 | A | * | 5/1998 | Farwell et al. ............. 370/431 |
| 5,790,587 | A | * | 8/1998 | Smith et al. ................ 375/147 |
| 5,881,245 | A | | 3/1999 | Thompson .................. 709/219 |
| 5,949,791 | A | * | 9/1999 | Byers et al. ................ 370/466 |
| 6,154,154 | A | * | 11/2000 | Suzuki et al. ................. 341/61 |

(Continued)

*Primary Examiner*—Jeffrey Gaffin
*Assistant Examiner*—Tanh Q Nguyen
(74) *Attorney, Agent, or Firm*—McAndrews, Held & Malloy, Ltd.

(57) ABSTRACT

Embodiments of the invention may provide a method for implementing an adaptive multimode media queue. A mode of operation may be determined for a received media stream based on a sampling rate of the media stream. The mode of operation may be a wideband mode and/or a narrowband mode. Depending on the determined mode, the adaptive multimode media queue may be partitioned into a low band media queue and a high band media queue. A wideband media stream split into a high band and a low band is buffered into the adaptive multimode media queue wherein the high band is stored in the high band media queue, and the low band is stored in the low band media queue. The high band media queue and low band media queue may be a contiguous memory block within the adaptive multimode media queue. The received media stream, which may have different sampled data rates may be buffered within the partitioned adaptive multimode media queue.

20 Claims, 4 Drawing Sheets

U.S. PATENT DOCUMENTS

| | | | |
|---|---|---|---|
| 6,233,245 B1 * | 5/2001 | Chapman et al. | 370/412 |
| 6,285,632 B1 | 9/2001 | Ueki | 379/32.01 |
| 6,470,051 B1 | 10/2002 | Campisano et al. | 375/240.21 |
| 6,470,409 B1 * | 10/2002 | Ridgeway | 710/305 |
| 6,519,255 B1 * | 2/2003 | Graves | 370/392 |
| 6,539,024 B1 * | 3/2003 | Janoska et al. | 370/412 |
| 6,721,826 B2 * | 4/2004 | Hoglund | 710/52 |
| 2003/0048798 A1 | 3/2003 | Scott et al. | 370/412 |

* cited by examiner

METHOD AND SYSTEM FOR AN ADAPTIVE MULTIMODE MEDIA QUEUE

CROSS-REFERENCE TO RELATED APPLICATIONS/INCORPORATION BY REFERENCE

This application is a divisional application of patent application Ser. No. 10/313,826 entitled "Method and System for an Adaptive Multimode Media Queue", filed Dec. 6, 2002, issued Jan. 25, 2005 as U.S. Pat. No. 6,848,012, which claims priority based on provisional application Ser. No. 60/414,492, "Method and System for an Adaptive Multimode Media Queue", filed Sep. 27, 2002, the complete subject matter of each of which is incorporated herein by reference in its entirety.

This application is also related to the following co-pending applications, each of which are herein incorporated by reference:

| Ser. No. | Docket No. | Title | Filed | Inventors |
| --- | --- | --- | --- | --- |
| 60/414,059 | 14057US01 | Multiple Data Rate Communication System | Sep. 27, 2002 | LeBlanc Houghton Cheung |
| 60/414,491 | 14061US01 | Dual Rate Single Band Communication System | Sep. 27, 2002 | LeBlanc Houghton Cheung |
| 60/414,460 | 14063US01 | Splitter and Combiner for Multiple Data Rate Communication System | Sep. 27, 2002 | LeBlanc Houghton Cheung |
| 60/414,493 | 14064US01 | Switchboard for Multiple Data Rate Communication System | Sep. 27, 2002 | LeBlanc Houghton Cheung |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Certain embodiments of the present invention relate to voice processing for broadband communication systems. More specifically, certain embodiments relate to a method and system for an adaptive multimode media queue for supporting data sampled at different rates.

Packet based telephony such as Internet Protocol (IP) telephony may provide an alternative to conventional circuit switched telephony, the latter of which may typically require the establishment of an end-to-end communication path prior to the transmission of information. In particular, IP telephony permits packetization, prioritization and simultaneous transmission of voice traffic and data without requiring the establishment of an end-to-end communication path. IP telephony systems may capitalize on voice-over-packet (VoP) technologies, which may provide a means by which voice, video and data traffic may be simultaneously transmitted across packet networks. The data may include video data.

Voice quality (VQ) may define a qualitative and/or quantitative measure regarding the quality and/or condition of a received voice signal. Voice clarity may be an indicator of the quality or condition of a voice signal. Voice quality may be an important parameter that may ultimately dictate a quality of service (QOS) offered by a network service provider. The following factors, for example, may affect the voice quality and/or condition of a voice signal—noise, echo, and delay or packet latency. However, the effects of these factors may be cumulative. In this regard, factors such as delay and latency may exacerbate the effects of echo. Delays that may affect the voice quality may include, but are not limited to, routing, queuing and processing delays.

Various VoP specifications, recommendations and standards have been created to ensure interoperability between various network components, and to create an acceptable QOS which may include voice quality. For example, the International Telecommunications Union (ITU) ratified H.323 specification, which may define the processes by which voice, video and data may be transported over IP networks for use in VoP networks. H.323 addresses, for example, delay by providing a prioritization scheme in which delay-sensitive traffic may be given processing priority over less delay-sensitive traffic. For example, voice and video may be given priority over other forms of data traffic.

H.323 also addresses voice quality by specifying the audio and video coders/decoders (CODECs) that may be utilized for processing a media stream. A CODEC may be a signal processor such as a digital signal processor (DSP) that may be adapted to convert an analog voice and/or video signal into a digital media stream and for converting a digital media stream into an analog voice and/or video signal. In this regard, a coder or encoder portion of the CODEC may convert an analog voice and/or video signal into a digital media stream. Additionally, a decoder portion of the CODEC may convert a digital media stream into an analog voice and/or video signal. Regarding the CODEC for audio signals, H.323 may support recommendations such as ITU-T G.711, G.722, G.723.1, G.728 and G.729 recommendations. ITU-T G.711 may support audio coding at 64 kbps, G.722 may support audio coding at 64 kbps, 56 kbps and 48 kbps, G.723.1 may support audio coding at 5.3 Kbps and 6.3 Kbps, G.728 may support audio coding at 16 kbps and G.729 may support audio coding at 8 kbps.

The voice quality of a speech CODEC may be dependent on factors such as the type of encoding and/or decoding algorithm utilized by the CODEC. In general, some CODECs may utilize compression algorithms that remove redundant information from the analog signal. Such compression algorithms may permit at least a close replication of an original analog signal. In this case, the bandwidth required for transmitting any resultant signal may be reduced. Other CODECs may utilize algorithms that analyze the signal and retain only those portions that are deemed to be of cognitive importance. These algorithms may reproduce a close approximation to the original signal. Notwithstanding, in this latter case, bandwidth utilization may be superior to the former case where redundant information may be removed. Accordingly, depending on application requirements and hardware limitations, one or more algorithms may be utilized to optimize performance.

Moreover, although economic attractiveness of VoP has lured network access providers and network transport providers away from traditional circuit switching networks, factors such as the extensiveness of embedded legacy systems and customer demands, for example, have dictated the coexistence of both packet switched and circuit switch networks. Accordingly, new technologies and techniques such as audio and video coding and decoding may be required to support various modes of operation utilized by each system.

Traditional voice telephony products are band-limited to 4 kHz bandwidth with 8 kHz sampling, known as "narrowband". These products include the telephone, data modems, and fax machines. Newer products aiming to achieve higher voice quality have doubled the sampling rate to 16 kHz to encompass a larger 8 kHz bandwidth, which is also known as "wideband" capable. The software implications of doubling the sampling rate are significant. Doubling the sampling rate not only requires doubling the processing cycles, but nearly doubling the memory used to store the data.

Doubling memory and processor cycles requirements is expensive because the memory and processing power footprints of DSPs are generally small. Implementing wideband support thus requires creativeness to optimize both memory and cycles.

Additionally, much of the software providing various functions and services, such as echo cancellation, dual-tone multi-frequency (DTMF) detection and generation, and call discrimination (between voice and facsimile transmission, for example), are written for only narrowband signals. Either software must be written for wideband signals, or the wideband signal down-sampled. Where the software is modified, the software should also be capable of integration with preexisting narrowband devices. Providing software for operation with both narrowband and wideband devices is complex and costly.

Accordingly, it would be advantageous if a scheme for seamlessly integrating services for both narrowband devices and wideband devices were provided.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the present invention provide for the implementation of a queue. The method may include determining a mode of operation of a received media stream and partitioning the queue into a first queue portion and a second queue portion dependent on the determined mode of operation. The received media stream may be buffered in the first queue portion and second queue portion for processing.

Determining the mode of operation may further include determining a sampling rate of the received media stream. The sampling rate may be one of a first or a second sampling rate. For example, the first sampling rate may be approximately 8 KHz, and the second sampling rate may be approximately 16 KHz. The first queue portion and second queue portion may be a contiguous memory block within the queue, and the received media stream may be digitally-encoded audio. The mode of operation may be a wideband mode and/or a narrowband mode. The received media stream may include a low band stream and a high band stream. The first queue portion may comprise a low band media queue and the second queue portion may comprise a high band media queue. The partitioning may preserve the low band media queue when the mode of operation changes. The low band stream may be buffered in the low band media queue and the high band stream may be buffered in the high band media queue.

Another aspect of the invention may include machine-readable storage, having stored thereon a computer program having a plurality of code sections executable by a machine for causing the machine to perform the foregoing.

These and other advantages, aspects and novel features of the present invention, as well as details of an illustrated embodiment thereof, will be more fully understood from the following description and drawings.

DETAILED DESCRIPTION OF THE INVENTION

Figure 1:
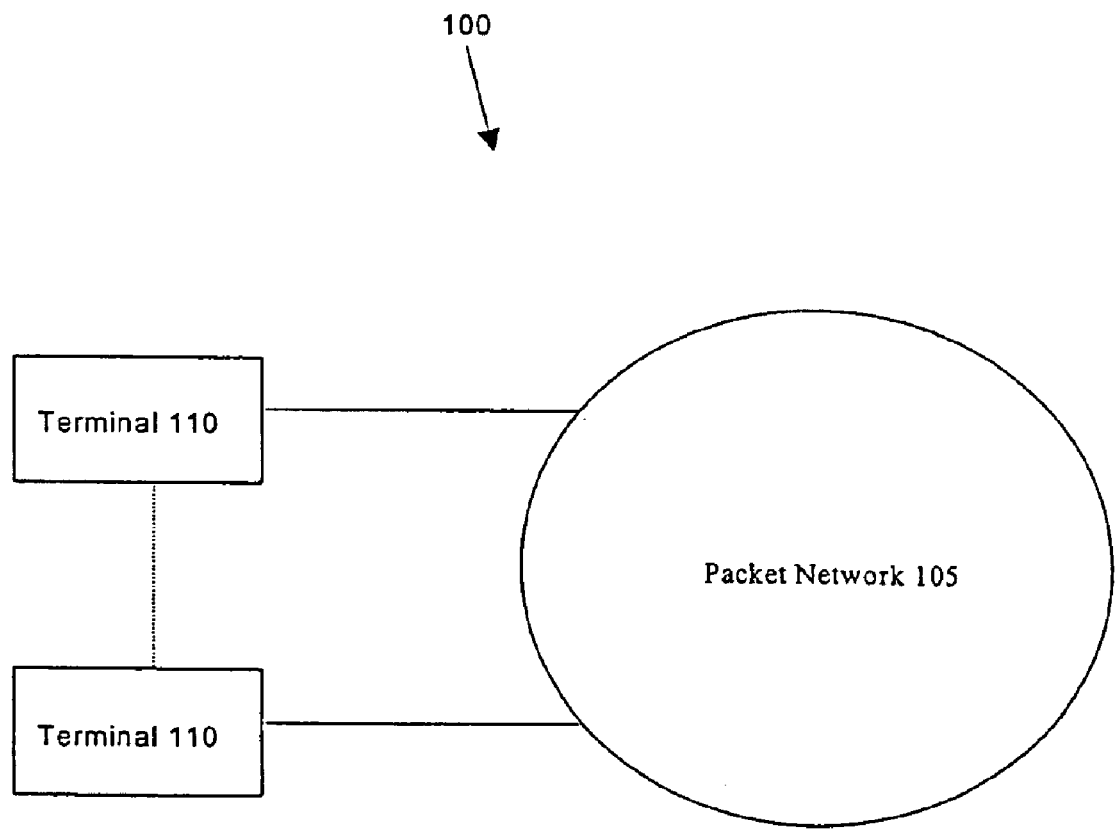
FIG. 1 is a block diagram of an exemplary communication system wherein the present invention can be practiced.

Aspects of the invention provide a method and system for an adaptive multimode media queue for supporting data sampled at different rates. Referring now to FIG. 1, there is illustrated a block diagram of an exemplary voice-over-packet (VoP) network 100, wherein the present invention can be practiced. The VoP network 100 comprises a packet network 105 and a plurality of terminals 110. The terminals 110 are capable of receiving user input. The user input can comprise, for example, the user's voice, video, or a document for facsimile transmission. The VoP network 100 supports various communication sessions between terminals 110 which simulate voice calls and/or facsimile transmissions over a switched telephone network.

The terminals 110 are equipped to convert the user input into an electronic signal, digitize the electronic signal, and packetize the digital samples. The sampling rate for digitizing the electronic signal can be either 8 KHz (narrowband) sampling, or 16 KHz (wideband) sampling. Accordingly, narrowband sampling is bandwidth limited to 4 KHz while wideband sampling is bandwidth limited to 8 KHz.

The VoP network 100 provides various functions and services, including dual-tone multi-frequency (DTMF) generation and detection, and call discrimination between voice and facsimile, by means of a Virtual Hausware Device (VHD) and a Physical Device Driver (PXD). The foregoing services are implemented by software modules and utilize narrowband digitized samples for inputs. For terminals 110 with narrowband sampling, the digitized samples are provided directly to the software modules. For terminals 110 with wideband sampling, the 8 KHz bandwidth is split into a high band and a G.712 compliant low band. The software modules requiring narrowband digitized samples operate on the low band, while software modules requiring wideband digitized samples operate on both the high band and the low band.

The split-band approach enables straightforward support for narrow and wide band services because narrowband services are incognizant of the wideband support. They only require and operate on an 8 KHz-sampled stream of data (i.e. the low band). Generally, only wideband services understand and operate on both bands.

Figure 2:
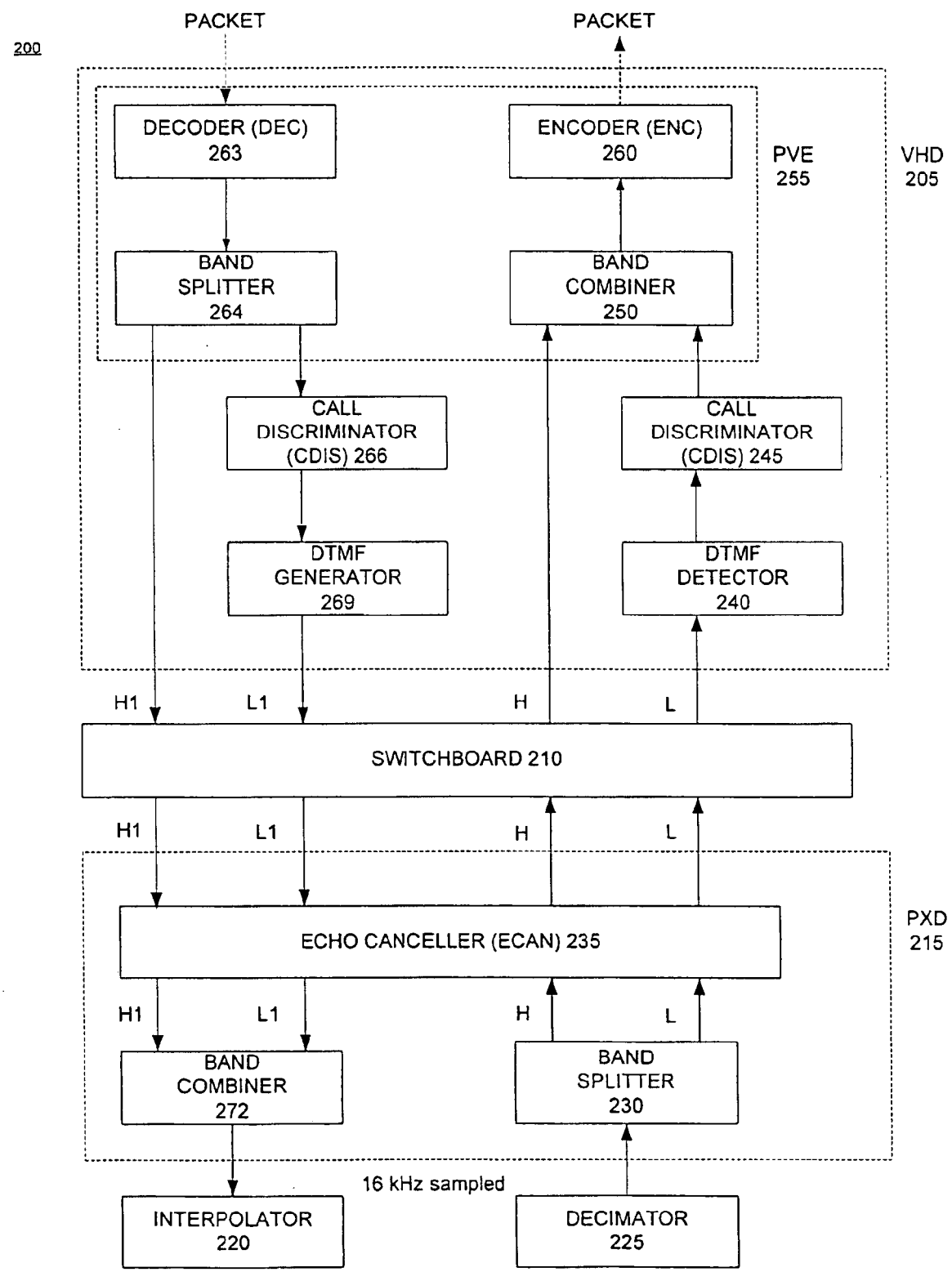
FIG. 2 is a signal flow diagram of a signal processing system operating in a voice mode wherein the present invention may be practiced.

Referring now to FIG. 2, there is illustrated a signal flow diagram of a split-band architecture 200 in accordance with an embodiment of the present invention. The split-band architecture 200 includes a Virtual Hausware Driver (VHD) 205, a switchboard 210, a physical device driver (PXD) 215, an interpolator 220, and a decimator 225.

The PXD 215 represents an interface for receiving the input signal from the user and performs various functions, such as echo cancellation. The order of the PXD functions maintains continuity and consistency of the data flow. The top of the PXD 215 is at the switchboard interface. The bottom of the PXD 215 is at the interpolator 220 and decimator 225 interface. For wideband operation the band-split/combine PXD function may be located generally as follows. On the switchboard side of this PXD function is split-band data. On the other side is single-band data. PXD functions that operate on single-band data, like the side-tone or high-pass PXD functions, are ordered below the split-band/combine PXD function. Other PXD functions that operate on split-band data are ordered above it.

The VHD 205 is a logical interface to the destination terminal 110 via the packet network 105 and performs functions such as DTMF detection and generation, and call discrimination. During a communication (voice, video, fax) between terminals each terminal 110 associates a VHD 205 with the terminal(s) 110 communicating therewith. For example, during a VoP network call between two terminals, each terminal 110 associates a VHD 205 with the other terminal 110. The switchboard 210 associates the VHD 205 and the PXD 215 in a manner that will be described below.

A wideband system may contain a mix of narrowband and wideband VHDs 205 and PXDs 215. A difference between narrowband and wideband device drivers is their ingress and egress sample buffer interface. A wideband VHD 205 or PXD 215 has useful data at its high and low-band sample buffer interfaces and can include both narrowband and wideband services and functions. A narrowband VHD 205 or PXD 215 has useful data at its low-band interface and no data at its high-band interface. The switchboard interfaces with narrowband and wideband VHDs 205 and PXDs 215 through their high and low-band sample buffer interfaces. The switchboard 210 is incognizant of the wideband or narrowband nature of the device drivers. The switchboard 210 reads and writes data through the sample buffer interfaces. The high and low-band sample buffer interfaces may provide data at any arbitrary sampling rate. In an embodiment of the present invention the low-band sample buffer interfaces provide data sampled at 8 KHz and the high-band sample buffer interface provides data sampled at 16 KHz. Additionally, a VHD 205 can be dynamically changed between wideband and narrowband and vice versa.

The VHD 205 and PXD 215 driver structures may include sample rate information to identify the sampling rates of the high and low-band data. The information may be part of the interface structure that the switchboard understands and may contain a buffer pointer and an enumeration constant or the number of samples to indicate the sample rate.

The split-band architecture 200 is also characterized by an ingress path and an egress path, wherein the ingress path transmits user inputs to the packet network, and wherein the egress path receives packets from the packet network 105. The ingress path and the egress path can either operate in a wideband support mode, or a narrowband mode. Additionally, although the illustrated ingress path and egress path are both operating in the wideband support mode, the ingress path and the egress path are not required to operate in the same mode. For example, the ingress path can operate in the wideband support mode, while the egress path operates in the narrowband mode. In this exemplary embodiment, the ingress path comprises the decimator 225, band splitter 230, echo canceller 235, switchboard 210, and services including but not limited to DTMF detector 240, call discriminator (CDIS) 245, and packet voice engine (PVE) 255 comprising a combiner 250 and an encoder algorithm 260.

In a wideband device, the decimator 225 receives the user inputs and provides 16 KHz sampled data for an 8 KHz band-limited signal. The 16 KHz sampled data is received by the band-splitter 230. The band-splitter 230 splits the 8 KHz bandwidth into a low band (L) and a high band (H). The low band, L, and high band, H, are transmitted through the echo canceller 235, and switchboard 210 to the VHD 205 associated with the destination terminal 110. The band-splitter 230 can comprise the band-splitter described in the co-pending application Ser. No. 60/414,491, "Splitter and Combiner for Multiple Data Rate Communication System", which is incorporated by reference in its entirety.

The VHD 205 receives the low band, L, and high band, H. In some cases, the DTMF detector 240 may be designed for operation on only narrowband digitized samples, and only the low band is passed to DTMF detector 240. Similarly, where CDIS 245 is designed for operation on only narrowband digitized samples, only the low band is provided to CDIS 245, which distinguishes a voice call from a facsimile transmission. The low band, L, and high band, H, are combined at a combiner 250 in packet voice engine 255. The combiner 250 can comprise the combiner described in the co-pending application Ser. No. 60/414,491, "Splitter and Combiner for Multiple Data Rate Communication System", which is incorporated by reference herein in its entirety.

The PVE 255 is responsible for issuing media queue mode change commands consistent with the active encoder and decoder. The PVE 255 ingress thread receives raw samples consisting of both low and high-band data. However, to save memory only low-band data is forwarded when the VHD 205 is operating in narrowband mode. Both low and high-band data are concatenated together and forwarded when operating in wideband mode.

At the packet voice engine 255, encoder 260 packetizes the combined signal for transmission over the packet network 105. The encoder 260 can comprise, for example, the BroadVoice 32 Encoder made by Broadcom, Inc.

The egress path comprises decoder 263, band splitter 264, CDIS 266, DTMF generator 269, switchboard 210, echo canceller 235, band combiner 272, and interpolator 220. The egress queue receives data packets from the packet network 105 at the decoder 263. The decoder 263 can comprise the BroadVoice 32 Decoder made by Broadcom, Inc. The decoder 263 decodes data packets received from the packet network 105 and provides 16 KHz sampled data. The 16 KHz sampled data is provided to band splitter 264 which separates a low band, L1, from a high band, H1. Again, where CDIS 266 and the DTMF generator 269 utilize narrowband digitized samples, only the low band is used by CDIS 266 and the DTMF generator 269.

The DTMF generator 269 generates DTMF tones if detected from the sending terminal 110. These tones are written to the low band, L1. The low band, L1, and high band, H1, are received by the switchboard 210. The switchboard 210 provides the low band, L1, and high band, H1, to the PXD 215. The low band, L1, and high band, H1, are passed through the echo canceller 235 and provided to the band combiner 272 which combines the low band, L1, and high band, H1. The combined low band, L1, and high band, H1, are provided to interpolator 220. The interpolator 220 provides 16 KHz sampled data.

The low band is stored as 8 KHz sampled data, while the high band is stored as 16 KHz sampled data. In one embodiment, both bands are not stored symmetrically as 8 KHz sampled data because the 8 KHz bandwidth is not split symmetrically down the center. This design incurs a memory cost in return for voice quality and G.712 compliance. Alternatively, if aliasing may be ignored the 8 KHz bandwidth may be split symmetrically with both low and high bands stored as 8 KHz sampled data. This alternative avoids the increased memory requirement but at the cost of voice quality. Both symmetric and asymmetric split-band architectures are similar in implementation except for the sampling rate of the media streams. In some designs, one may be more desirable. In other designs, the reverse may be true. The optimal choice depends on an acceptable memory versus performance trade-off.

Figure 3:
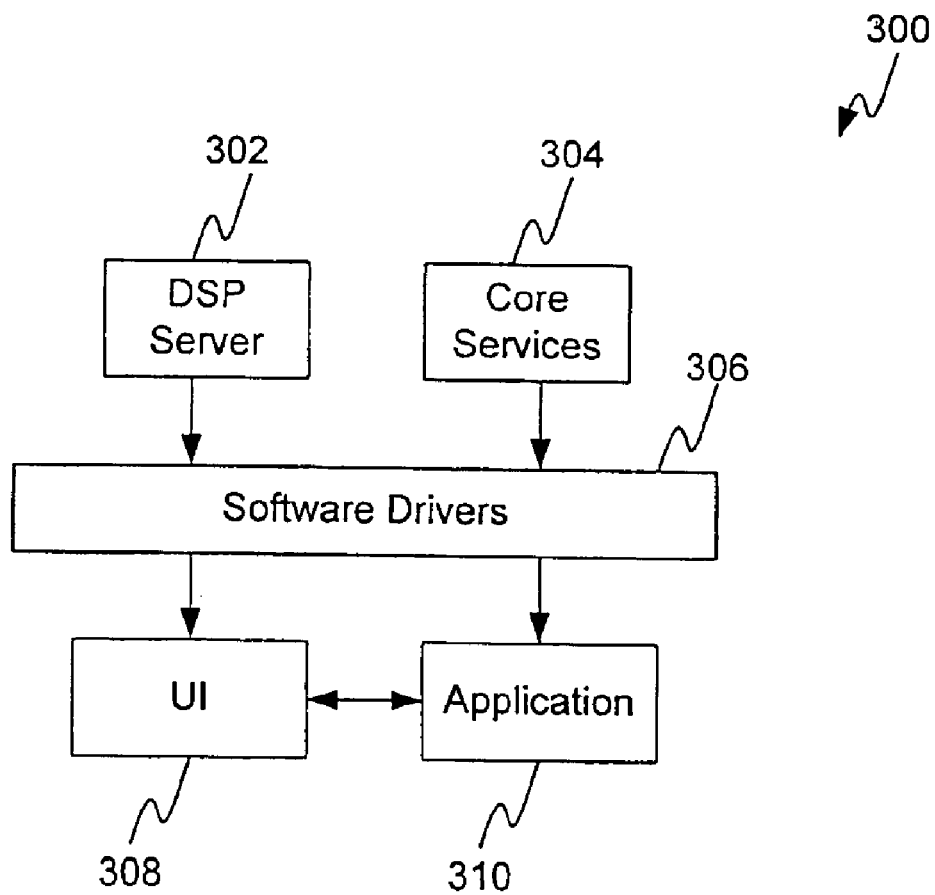
FIG. 3 is a block diagram of an exemplary software suite that may be used to build a computer-based telephony application.

An embodiment of the present invention can be under the control of a computer-based telephony application. In order to reduce the time that may be necessary for building computer-based telephony applications, a software suite containing the necessary applications, drivers and core services may be created. The software suite may be adapted to handle media streams comprising voice, video, data and any combination of services thereof. FIG. 3 is a block diagram of an exemplary software suite that may be used to build a computer-based telephony application. Referring to FIG. 3, software suite 300 may include a DSP server block 302, a core services block 304, a software driver block 306, a user interface (UI) block 308, and an application block 310.

The core services block 304 may include, for example, application programming interfaces (APIs) that may be required to implement a particular telephony service for an application within the application block 310. Accordingly, DSP server 302 may be adapted to provide connectivity to services offered by the core services block 304. The software drivers block 306 may be configured to provide the necessary software drivers that may enable an application such as a telephony application within application block 310, to implement a particular telephony service using an API provided by the core services block 304. For example, a multimedia telephony service application within the application block 310 may utilize one or more virtual drivers (VHD) within the software driver block 306 to implement a video telephone call. In this case, the multimedia telephony service application may utilize APIs provided by the core services block 304 to implement the video telephone call. User interface 308 may provide, for example, a graphical interface that may be adapted to simplify creation, testing, debugging and interfacing of applications within the application block 310.

A media stream may contain voice, video, and/or data and may be configured to operate in one or a plurality of modes. For example, a media stream may be configured to operate in a narrow band mode and/or a wide band mode and/or any other mode depending on the capabilities of the system. In this regard, one or more virtual drivers may be adapted to provide some or all of the capabilities and/or functionalities that may be required by an application needing to utilize services offered by the core services block 304.

In accordance with the present invention, in the case of a media stream that may utilize a narrowband and wideband mode, a media queue buffer may be adapted to handle data for a particular VHD. In accordance with the invention, a VHD's media queue buffer may be configured as a single media queue that may store sampled data for a narrowband mode of operation. For example, a media queue may be configured to buffer low-band data sampled at a rate of about 8 KHz. In wideband mode, the same media queue buffer may be partitioned into two media queues. As noted above, the wideband media is band split into a low band, L, and a high band, H. A first portion of the partitioned media queue may be configured to buffer the low band, L, data. A second portion of the partitioned media queue may be configured to buffer high band, H, data. For example, the second portion of the partitioned media queue may be configured to buffer high-band data sampled at a rate of about 16 KHz.

Figure 4:
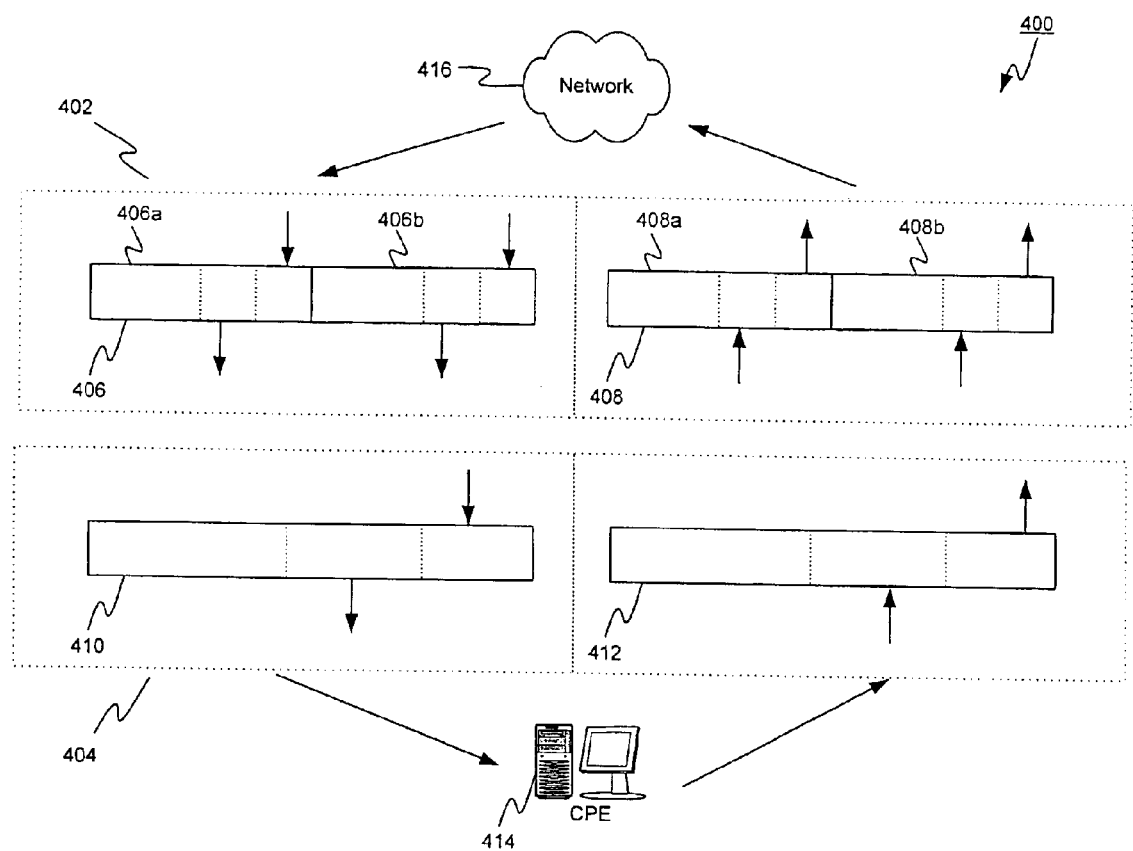
FIG. 4 is a block diagram of an adaptive multimode media queue for supporting data sampled at different rates in accordance with an embodiment of the present invention.

FIG. 4 is a block diagram 400 of an adaptive multimode media queue for supporting data sampled at different rates in accordance with an embodiment of the present invention. Although the adaptive multimode media queue of FIG. 4 illustrates a media queue having two modes of operation, the invention is not limited in this regard, and more than two modes may be utilized without departing from the spirit of the invention. The media queue buffer may be a linear block of memory that may be provisioned for narrowband and/or wideband modes of operation. In narrowband mode, the media queue buffer may be provisioned for narrowband media buffering. In wideband mode, the media queue buffer may be partitioned or divided into two or more adjacent or contiguous blocks of memory. In a case where the media queue buffer may be partitioned into a low-band and a high-band block of memory buffer, a first block of the memory buffer may be adapted to store the low-band data, while a second block of the memory buffer may be adapted to store the high-band data.

Referring to FIG. 4, there is shown a media queue buffer 406 partitioned for wideband mode 402 and a media queue buffer 410 partitioned for narrowband mode 404. Wideband mode media queue buffer 406 and narrowband mode media queue buffer 410 may illustrate an egress path from a network 416 to a user interface, such as user interface 308 at customer premise equipment (CPE) 414. FIG. 4, also shows a media queue buffer 412 partitioned for narrowband mode 404 and a media queue buffer 408 partitioned for wideband mode 402. Narrowband mode media queue buffer 412 and wideband mode media queue buffer 408 may illustrate an ingress path to network 416 from a customer premise equipment (CPE) 414. Wideband media queue buffer 406 may be adapted to receive an input media stream from network 416 and pass any resulting processed samples to CPE 414. In wideband mode, the media queue 406 may be partitioned into two adjacent or contiguous portions of memory, namely 406a and 406b. Narrowband media queue buffer 410 may be adapted to receive an input media stream from network 416 and pass any resulting processed samples to CPE 414. In operation, depending on the mode of the media stream, the configuration of the media queue may be dynamically reconfigured in accordance with an embodiment of the invention as illustrated in FIG. 4.

In an illustrative embodiment of the invention, a VHD may be adapted to process data formatted in a G.723.1 format. Since the data may be sampled at a data rate of 8 KHz, it may be classified as low-band data and a narrowband CODEC may be required to process data for a media queue used to buffer the sampled low-band data. In this case, the media queue requirements may necessitate a double-buffered 30 ms media queue, although the invention is not so limited. Accordingly, a wideband VHD may not be required in this case. Notwithstanding, in one aspect of the invention, a wideband VHD arrangement may be adapted to handle the low-band data sampled at a rate of 8 KHz. In this case, there may be no need to reconfigure a wideband media queue buffer used to handle the low-band data. A wideband media queue may be allocated to process the low-band data regardless of whether a narrowband or wideband CODEC is required.

In certain VoP applications, for example, data may be sampled at a rate of 16 KHz. Since the data may be sampled at a data rate of 16 KHz, it may be classified as wideband data and a wideband CODEC may be required to process data for a media queue used to buffer the sampled wideband data. In this case, the media queue requirements may necessitate a double-buffered 5 ms media queue. In order to accommodate a periodic double-buffered 5 ms media queue, each media queue buffer may be configured to have a minimum of 240 words. To support a narrowband CODEC for G.723.1A, 480 words may be required for double-buffered 30 ms 8 KHz sampled data. A VoP application may simultaneously support a G.723.1 A (30 ms) CODEC, and a wideband CODEC such as BroadVoice32 (5 ms). The former codec may require 30 ms double-buffered media queues with narrowband or 8 khz sampled data (therefore, 480 words of memory). The latter may require 5 ms doubled-buffered media queues with wideband or 16 khz sampled data (for example, 80 words for low-band+160 words for high-band=240 samples). The total memory requirements to support both CODECs simultaneously would be enormous unless a dynamic reconfiguration of the media queue is done. Advantageously, the ability to reconfigure the media queue buffer into two or more media queue partitions may significantly reduce memory utilization. Accordingly, any supported thread block rates may be determined by the size of the media queue buffer. The thread block rate may define a number of samples that are to be processed within each thread of operation. In this regard, a media queue buffer may store double-buffered 5 ms 8 KHz sampled low-band data and doubled buffered 5 ms 16 KHz sampled high-band data. In a case where 10 ms threads are preferred, then 480 words may be utilized per media queue buffer.

In accordance with the invention, the VHD mode of operation may be determined by a status of a currently active CODEC. During transitions between narrowband and wideband VHD modes, the low-band data may be retained to minimize glitches that may occur due to the transitions. This may be particularly important in the case of wideband voice, where the VHD mode may change in order to avoid injecting artificial phase reversals into signals comprising the data stream.

In one aspect of the invention, the media queues may be configured to store block samples for services and there may be a one-to-one correspondence between a service and a media queue. In a split-band architecture where a single incoming data stream for a particular service may be split into two or more bands, for example, a low band, L, and a high band, H, data stream, the media queue-may be adapted to store both the low band, L, and the high band, H, data streams. However, to reduce memory utilization, the media queue buffer may be adapted so that it may not have to store high band, H, data when the VHD is operating in narrowband mode. For example, in a case where G.723.1 may be the active voice compression algorithm, 30 ms media queues may be required. Since the algorithm may be processing low-band data, it may not be necessary to store any high-band data. Accordingly, the media queue buffer may be dynamically reorganized based on the VHD mode. In a case where there are more than two modes, the media queue may be adapted to be dynamically repartitioned as the mode of the VHD changes.

As the mode of the VHD changes and the media queue is repartitioned, discontinuities in the data stream may occur, for example, when the frame rate changes. In accordance with the invention, it may be desirable to replace transient fluctuations with periods of silence. For example, when a VHD transitions between a narrowband mode and a wideband mode, and vice versa, silence may be achieved by properly clearing a filter history associated with buffered data in the media queue. In another aspect of the invention, thresholds may be established during the transitions between the various VHD modes of operation. Once these thresholds have been met, a comfort noise generator may be configured to inject comfort noise into any resulting data stream.

In accordance with an embodiment of the invention, an API function may be created to support media queue mode transitions. A mode transition may be defined as either a switch between the VHD modes, for example a switch between wideband and narrowband mode, or a frame rate change, although the invention is not so limited. The following may be an exemplary function prototype for an API function in accordance with the invention.

void hsfMedqModeSet(MedqModes mode, UINT16 framesize);

The hsfMedqModeSet API function may create a resource manager command to configure the media queue mode for the current processing thread. An underlying function which may be used to implement the mode change may consider the required size of the media queue buffer, determine if sufficient memory may be available for the requested mode and frame size, and reconstruct the media queue buffer.

In another aspect of the invention, memory descriptors may be utilized to access pointers to the high-band media queue. Exemplary memory descriptors may include, but are not limited to, HSF_MEDQ_16KHZ_INGRESS and HSF_MEDQ_16KHZ_EGRESS. Their definitions may be added to a HSF_DESC and HSF_MEDQ enumerations.

```
typedef enum
{   HSF_DESC_INGRESS = 0,
    HSF_DESC_EGRESS,
    HSF_DESC_BMPOOL,
    HSF_DESC_BMBIGPOOL,
    HSF_DESC_FREEBUFHACK,
    HSF_DESC_16KHZ_INGRESS,
    HSF_DESC_16KHZ_EGRESS
}   HSF_DESC;
typedef enum
{
    HSF_MEDQ_INGRESS = HSF_DESC_INGRESS,
    HSF_MEDQ_EGRESS = HSF_DESC_EGRESS,
    HSF_MEDQ_16KHZ_INGRESS =
    HSF_DESC_16KHZ_INGRESS,
    HSF_MEDQ_16KHZ_EGRESS =
    HSF_DESC_16KHZ_EGRESS
}   HSF_MEDQ;
```

A typical sequence which may be used to access, for example, the egress high-band media queue may be illustrated below.

```
/* Get current media queue input pointer */
mediaQData = hsfMedqGetPtr( HSF_DESC_16KHZ_EGRESS );
hsfMedqAdd( mediaQData, speechbufp, decctlp->threadsize );
```

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for implementing a queue, the system comprising:
   a processor determining a mode of operation of a received media stream comprising determining a sampling rate of said received media stream;
   said processor partitioning the queue into a first queue portion comprising a low band media queue and a second queue portion comprising a high band media queue depending on said determined mode of operation; and
   buffering said received media stream in said first queue portion and said second queue portion.

2. The system according to claim 1, wherein said sampling rate is at least one of a first sampling rate and a second sampling rate.

3. The system according to claim 2, wherein said first sampling rate is approximately 8 KHz.

4. The system according to claim 2, wherein said second sampling rate is approximately 16 KHz.

5. The system according to claim 1, wherein said first queue portion and said second queue portion are a contiguous memory block within the queue.

6. The system according to claim 1, wherein said received media stream comprises digitally encoded audio.

7. The system according to claim 1, wherein said mode of operation is one of at least a wideband mode and a narrowband mode.

8. The system according to claim 1, wherein said received media stream comprises at least a low band stream and a high band stream.

9. The system according to claim 1, wherein said partitioning further comprises preserving said low band media queue if said mode of operation changes.

10. The system according to claim 1, wherein said buffering further comprises buffering a low band stream within said low band media queue and a high band stream within said high band media queue.

11. A system having machine-readable storage having stored thereon a computer program having a plurality of code sections for implementing a queue, the code sections executable by the system, causing the system to perform the operations comprising:
    determining a mode of operation of a received media stream, comprising determining a sampling rate of said received media stream;
    partitioning the queue into a first queue portion comprising a low band media queue and a second queue portion comprising a high band media queue depending on said determined mode of operation; and
    buffering said received media stream in said first queue portion and said second queue portion.

12. The system according to claim 11, wherein said sampling rate is at least one of a first sampling rate and a second sampling rate.

13. The system according to claim 12, wherein said first sampling rate is approximately 8 KHz.

14. The system according to claim 12, wherein said second sampling rate is approximately 16 KHz.

15. The system according to claim 11, wherein said first queue portion and said second queue portion are a contiguous memory block within the queue.

16. The system according to claim 11, wherein said received media stream comprises digitally encoded audio.

17. The system according to claim 11, wherein said mode of operation is one of at least a wideband mode and a narrowband mode.

18. The system according to claim 11, wherein said received media stream comprises at least a low band stream and a high band stream.

19. The system according to claim 18, wherein said partitioning further comprises preserving said low band media queue if said mode of operation changes.

20. The system according to claim 18, wherein said buffering further comprises buffering said low band stream within said low band media queue and said high band stream within said high band media queue.

* * * * *